CATION OF TEXTILES & FIBERS,

UNITED STATES PATENT OFFICE.

GEORGE LUNGE, OF HOTTINGEN, NEAR ZURICH, SWITZERLAND.

APPLICATION OF CHLORIDE OF LIME TO BLEACHING PURPOSES.

SPECIFICATION forming part of Letters Patent No. 325,684, dated September 8, 1885.

Application filed February 5, 1885. (No specimens.) Patented in France August 8, 1884, No. 163,691, and in Belgium August 30, 1884, No. 65,986.

*To all whom it may concern:*

Be it known that I, GEORGE LUNGE, doctor of philosophy and professor of chemistry, a British subject, residing at Hottingen, near Zurich, Switzerland, have invented certain new and useful Improvements in the Application of Chloride of Lime for Bleaching and other Purposes, (for which I have received Letters Patent in Belgium, No. 65,986, dated 30th day of August, 1884, and for which I have applied for a French patent the 8th day of August, 1884;) and I do hereby declare that the following is a full, clear, and exact description of the invention, which will enable others skilled in the art to which it appertains to make and use the same.

Many proposals have been made for increasing the action of solutions of chloride of lime, commonly called "bleaching-powder," by the addition of agents which liberate from it chlorine or hypochlorous acid. Hydrochloric, sulphuric, or oxalic acid, when employed for this purpose, cause the evolution of free chlorine, which acts too strongly upon the fibers and is injurious both to the health of the workmen and the machinery. Carbonic acid does not liberate chlorine, but hypochlorous acid; but its gaseous state is inconvenient for its practical application, and it causes the precipitation of calcium carbonate within the fibers, which is also the case with the action of bleaching-powder in the ordinary way, and which compels finishing the operation by "souring"—that is, steeping in weak hydrochloric or sulphuric acid. I have discovered that an agent hitherto not employed for this purpose combines all the advantages of the materials formerly employed without any of their drawbacks. This is acetic acid or any other weak organic acid of analogous nature. Its price is no impediment, for a minimum quantity is sufficient, the same being regenerated over and over again. At first acetic acid and chloride of lime decompose into calcium acetate and free hypochlorous acid. In the bleaching process the latter yields its oxygen, hydrochloric acid being formed. The latter instantly acts upon the calcium acetate. Calcium chloride is formed and acetic acid is regenerated, which decomposes a fresh quantity of chloride of lime, and so forth. Consequently the smallest quantity of acetic acid suffices for splitting up any amount of chloride of lime into calcium chloride and active oxygen. These reactions are shown by the following equations: First, $2CaOCl_2 + 2C_2H_4O_2 = Ca(C_2H_3O_2)_2 + CaCl_2 + 2HOCl$; second, $2HOCl = 2HCl + O_2$; third, $Ca(C_2H_3O_2)_2 + 2HCl = CaCl_2 + 2C_2H_4O_2$.

The hydrochloric acid formed according to equation two is never present in the free state, as it instantly acts upon calcium acetate according to equation three. This is very important, since hydrochloric acid weakens the fiber by prolonged contact, while acetic acid is quite harmless. Since there are no insoluable calcium salts present, the operation of souring after the bleaching is quite unnecessary. This not merely saves the expense of the acid and of the subsequent washing of the fabrics, but it also avoids the danger, especially present in the case of stout fabrics, of leaving some of the acid in the stuff, which concentrates on drying and weakens the fiber. It may also prove injurious for subsequent dyeing processes; but in the new process no free acid is present except acetic acid, which has no action upon the fiber, even in the concentrated state and at a high temperature.

The acetic acid may be employed in various ways, of which the following are only specimens: A small quantity of it may be added from the first to a solution of bleaching-powder; or the fabric, after being treated in the ordinary way with a solution of bleaching-powder, may be steeped without previous washing in water containing a little acetic acid; or the fabric may be steeped in water containing a little acetic acid, and a solution of bleaching-powder subsequently run in slowly and gradually with continuous agitation; or any other suitable means of using it may be employed, according to the various natures of the materials to be treated. In the case of hard water or of impure solutions of bleaching-powder a good deal of acetic acid would be consumed for neutralizing the lime. In this case some hydrochloric or sulphuric acid may be added in order to effect this neutralization; but the quantity of mineral acids should never exceed that required for this object, so that never any acid except hypochlorous or acetic acid exists in the free state. If the proper precautions are taken there is a considerable saving of bleaching-powder in comparison with the ordinary process, and the water-courses are less fouled.

My process is applicable to the bleaching of vegetable fibers in the unspun state or spun or woven, for locally discharging many colors, such as alizarine-red; for bleaching paper-pulp made of rags, wood, straw, esparto, and the like; for manufacturing wood pulp direct from woody fiber, and for many other purposes.

Whenever in this description the words "acetic acid" are used there should be understood: "or any other weak organic acid of analogous nature—such as formic acid and several others."

Having fully described my invention, what I desire to claim, and secure by Letters Patent, is—

Increasing and hastening the action of chloride of lime and saving the usual operation of souring after the bleaching without injuring the fiber in any way by the action of acetic or formic acid, as described.

In testimony whereof I sign this specification in the presence of two subscribing witnesses.

GEORGE LUNGE.

Witnesses:
  EMIL BLUM,
  ED. EGLI.